United States Patent [19]

Taylor et al.

[11] Patent Number: 5,008,227
[45] Date of Patent: Apr. 16, 1991

[54] PROCESS FOR MAKING ACID ACTIVATED BLEACHING EARTH USING HIGH SUSCEPTIBILITY SOURCE CLAY AND NOVEL BLEACHING EARTH PRODUCT

[75] Inventors: Dennis R. Taylor, Willoughby Hills, Ohio; Charles B. Ungermann, Livermore, Calif.

[73] Assignee: Engelhard Corporation, Iselin, N.J.

[21] Appl. No.: 352,790

[22] Filed: May 16, 1989

[51] Int. Cl.$^5$ .......................... B01J 20/12; B01J 20/30
[52] U.S. Cl. .......................................... 502/83; 502/81
[58] Field of Search ...................... 502/81, 82, 83, 408

[56] References Cited

U.S. PATENT DOCUMENTS

| 1,492,184 | 4/1924 | Weir | 502/81 |
| 1,752,721 | 4/1930 | Bierce | 502/81 |
| 1,781,265 | 11/1930 | Baylis | 502/83 |
| 1,946,124 | 2/1934 | Belden | 502/72 |
| 2,192,000 | 2/1940 | Wilson | 502/83 |
| 2,477,386 | 6/1949 | McCarter | 502/83 |
| 2,898,304 | 8/1959 | Powell et al. | 502/83 |

FOREIGN PATENT DOCUMENTS 583497  9/1959  Canada .................................. 502/408

Primary Examiner—Carl F. Dees

[57] ABSTRACT

A process for making acid-activated bleaching earth from a crude attapulgite clay. A crude is selected which is mildly acidic and contains at least about 90% attapulgite. The process involves treating such clay with low levels of activating acid which are mixed with the dried and ground clay, or spray dried from slurries containing the clay-acid mixture. Advantages include: lower acid costs/unit mass of clay treated, lower production costs (no washing, filtering, or waste treatment steps) and environmental soundness (no harmful environmental waste products are produced).

9 Claims, No Drawings

PROCESS FOR MAKING ACID ACTIVATED BLEACHING EARTH USING HIGH SUSCEPTIBILITY SOURCE CLAY AND NOVEL BLEACHING EARTH PRODUCT

RELATED APPLICATIONS

This application is related to USSN 352,578 filed concurrently herewith.

1. Field of the Invention

The invention relates to a process for making acid-activated bleaching earth from attapulgite clay and to novel acid-activated bleaching earth products obtained thereby.

2. Background

Acid-activated clays of high activity are used to adsorb colored pigments (carotenoids, chlorophyll) and colorless pigments (phospholipids) from edible and inedible oils. This process is called "bleaching" and serves both cosmetic and chemical purposes. Thus, bleaching reduces color, whereby very clear, almost water white oils are produced that meet with consumer expectations. Bleaching also stabilizes the oil by removing colored and colorless pigments which tend to "destabilize" the oil, resulting in oils that rancidify more easily if they are not removed. The current, and expected long term trend, favors the use of highest possible bleaching efficiency clays with this process because: (i) the smaller amounts of the high activity clays needed to produce desired refined oil properties mean that lower inventories can be maintained by the oil refiner; (ii) refined oil losses depend somewhat on the amount of clay used because less of high activity clay needs to be used and therefore oil losses are lower; and (iii) less spent clay is produced when using high activity clay, and hence land-fill disposal costs are lower.

The conventional process for producing acid-activated bleaching clays utilizes calcium bentonite clays and requires relatively high acid dosages to achieve maximum bleaching efficiencies. The calcium bentonites used in the process are hydrated sodium calcium aluminosilicates which typically are mildly basic. The manufacture of highest quality commercial bleaching earths typically require 70–90 grams of 96% $H_2SO_4$/100 grams of dry clay or 67.2–87.4% acid dosage where: % Acid $$\text{Dosage} = \frac{\text{wt. of pure acid}}{\text{wt. of dry clay}} \times 100$$

Extensive leaching of the clay structure in the form of solubilized salts takes place and these are removed in the process. Because of these high acid dosages, and the extensive leaching that takes place during the leaching process, the yield of bleaching clay is low (typically in the range of 75–85 wt %). The acidic salts formed during activation and residual acid must be washed off and separated by filtration from the product clay. If high levels of unused acid and acidic salts (iron and aluminum sulfates) are left in the clay, the quality of the bleached oil is impaired. High residual acid levels generate undesirable free fatty acids from the fatty acid triglycerides in the oil. Finally, the leachate (acidic salts and residual acid) is a waste stream that contains materials harmful to aquatic life and therefore must be neutralized or otherwise disposed of in an environmentally acceptable manner. This constitutes an additional expense of producing bleaching clays from pure calcium bentonites.

Clay sources used in the past to provide acid-activated bleaching clay of high activities have been primarily restricted to calcium bentonites, i.e., clays in which the principal exchangeable cation is a calcium ion, and these are sometimes also referred to as sub-bentonites.

Another type of naturally-occurring clay simply requires heat to impart bleaching activity. These are the clays rich in the minerals attapulgite or sepiolite, now frequently classified as palygorskite clays. Mineralogically, the palygorskite clays are readily distinguishable from the bentonites (smectites or montmorillonites) and rarely are palygorskites and bentonites used interchangeably.

It has been the general belief that palygorskite clays do not respond to the conventional acid-activation treatment. The same is true of certain bentonites, namely sodium (swelling) bentonites, such as Wyoming bentonites.

The following publications pertain to the art of preparing bleaching earths from naturally-occurring clays.

A.D. Rich, "Bleaching Clay", Industrial Rocks & Minerals, 3rd. Ed., AIME, N.Y. pp 92–101 (1960).

R. Fahn, "Bleaching Earths-Preparation, Properties, Practical Applications", Chapter 1 Internal Symposium, Brussels, April 28–29 (1976).

L.L. Richardson, "Use of Bleaching Clays in Processing Edible Oils", *JAOCS*, 55, 777 (1978).

G.M. Clarke, "Special Clays", *Ind. Minerals*, Sept., 25 (1985).

D.R. Taylor, D.B. Jenkins, "Acid-Activated Clays", *Soc Mining Eng Of AIME, Transactions*, 282 1901 (1988).

R.L. Grim, "Applied Clay Mineralogy", pp 320–326, (1962).

A.C.D. Newman, "Chemistry of Clays and Clay Minerals," pp 107–114, (1987).

The following patents relate to the production of acid-activated bleaching earths:

U.S. Pat. No. 1,397,113 (1921); Prutzman
U.S. Pat. No. 1,579,326 (1924); Kauffman
U.S. Pat. No. 1,642,871 (1927); Chapel
U.S. Pat. No. 2,470,872 (1949); Secor
U.S. Pat. No. 2,472,489 (1949); Pierce
U.S. Pat. No. 2,484,828 (1949); Hickey
U.S. Pat. No. 2,553,239 (1946); Christianson
U.S. Pat. No. 2,563,977 (1949); Van Horn, Kahn
U.S. Pat. No. 2,574,895 (1951); Stecker
U.S. Pat. No. 2,671,058 (1952); Mickelson
U.S. Pat. No. 2,872,419 (1959); Farnand
U.S. Pat. No. 2,892,800 (1959); Taipale
U.S. Pat. No. 2,981,697 (1961); Mickelson, et. al.
U.S. Pat. No. 3,617,215 (1971); Massaire, et. al.
EPA No. 0,276,954 (1988); Alexander Generally, in the patents listed above, calcium bentonites are the source clays and high acid dosages, typically above 40–50 gms of 96% $H_2SO_4$/100 gms of dry clay, are required for maximum improvement in bleaching efficiency. The acid treated clay is invariably washed to remove soluble salts and entrained acid. See, for example, U.S. Pat. No. 1,397,113, U.S. Pat. No. 1,642,871 and the recently published EPA (0,276,954).

It is known to add citric acid to oils that are bleached with mixed attapulgite/calcium bentonite bleaching earths in order to enhance chlorophyll adsorption. Citric acid is not used to activate the clay. U.S. Pat. No.

3,029,783 (Sawyer, et al), directed to an improved animal litter composition, describes an acid treatment, preferably using an attapulgite clay, which employs relatively low acid dosages without washing. The processing requires a calcination treatment at 700°–1,000° F. prior to the acid treatment and a second calcination at 750°–1,100° F. after acid treatment. The patent is not directed to the manufacture of a bleaching earth and we have found that the procedure does not lead to the preparation of a high efficiency bleaching earth.

3. The Invention

Surprisingly, it has been found that mildly acidic uncalcined palygorskite such as attapulgite clay, hereinafter referred to as "high susceptibility attapulgite clays" (HSAC) requires significantly lower acid dosages (e.g., 10–30 grams of 96% $H_2SO_4$/100 grams clay) to achieve their maximum bleaching levels. Because so little acid needs to be used with these clays, residual acid levels left on these clays are quite low and subsequent washing, filtration steps or post-calcination steps are unnecessary. In fact, it has been found that the requisite acid can simply be sprayed on dry powdered clay, or a clay-acid slurry can be mixed and then spray dried, to produce a high activity bleaching clay.

Palygorskite clays include attapulgite clays also known as Attapulgus clay, or Georgia-Florida fuller's earth. These clays are usually frequently composed principally of the mineral attapulgite, a crystalline hydrated magnesium aluminum silicate, but may also contain significant amounts of other minerals such as montmorillonite, calcium carbonate, quartz (silicate) and feldspar, and in some cases sepiolite. Those attapulgite clay used in the practice of this invention contain at least about 90% of the mineral attapulgite and are limited to those clays which are low in their content of carbonate minerals. This excludes most commercial deposits of primary and sedimentary sources of attapulgite clay which are usually associated with limestone.

The results of experiments conducted with high purity, low carbonate attapulgite showed that it took 10–30 wt % acid dosages to achieve maximum activity with these material. Higher acid dosages (i.e. 70–90 wt %) are required to achieve maximum adsorptive capacities for bentonite clays.

DESCRIPTION OF PREFERRED EMBODIMENTS

By high susceptibility attapulgite clay, we mean those naturally occurring attapulgite crudes which: (1) contain at least 90% (wt) attapulgite content; (2) possess a slurry pH less than 7; and (3) have pore volume greater than about 0.20 cc/gm.

Generally, suitable high susceptibility attapulgite clay contains no more than 5% by weight $CO_2$, and preferably less than 1% by weight $CO_2$, on a moisture free basis.

In defining clays the terms "volatile matter" (V.M.) and "Loss on Ignition" (L.O.I.) must frequently be used. Volatile material is classified according to three levels of thermal treatment: loosely-held water of hydration known as free-moisture (F.M.) which is measured by heating to constant weight at 220° F., structural water that is held chemically in the molecular structure of the clay and is measured by heating from 220° F. to constant weight at 1200° F., and other volatile matter such as inorganic carbonates, principally calcium carbonate, which release $CO_2$ at 1800° F.

Various methods related to water content or thermal treatment may be used to express percentages of components in the clay. A moisture-free weight, or dry weight, is the weight of the clay after heating to constant weight at 220° F. A volatile-free basis weight is the weight of the clay after heating to constant weight at 1200° F., and a loss-on-ignition or L.O.I. basis weight is determined by heating to constant weight at 1800° F. Also, volatiles content may be expressed on an as received basis.

The difference between loss on ignition weight and volatile-free weight is a fairly accurate representation of carbonate content, since carbonates generally account for virtually all of the non-aqueous volatile matter in the clay. An alternative method for measuring the carbonate content (as % $CO_2$) is to finely pulverize the clay and heat in the presence of a strong mineral acid such as hydrochloric acid to release carbon dioxide. The gas can then be collected and its volume measured, from which the weight percent of $CO_2$ can be calculated. This former method was employed to determine the carbonate content of clays used in the examples described hereinafter.

X-ray diffraction is used to determine the attapulgite content of the attapulgite/crude clays. To do this, a comparison is made between the peak areas of the 110 peak of attapulgite and the 001 peak of the montmorillonite in the region 3°–20° $2\theta$ when XRD machine conditions are as follows:

| | | |
|---|---|---|
| beam slit - .2° | baseline - .15V | window - 1V |
| Cu K - α/Ni filter | beam current - 31 mA | voltage - 40KV |
| rate - ½°/min. | chart speed - 1 cm/min. | range - 1K or |
| time constant - 1 sec. | | 10K CPS |

In order to calibrate the intensity of these two peaks, a series of mixtures of pure crude attapulgite (Emcor ® 66 low-carbonate clay) and pure crude bentonite (Filtrol Gr 2) were prepared by mixing known quantities of the finely ground powders (100% T-325 mesh) whose moisture contents were also known. With this information (i.e.—weight and moisture content of the clays used) and the resultant XRD patterns for each of the mixtures, it is possible to calibrate the relative response of these two peaks to the x-ray beam. The assumption is made that the response of these peaks in a physical mixture is the same as it will be in the naturally occurring mixture of these two clays. Using this method, it was determined that the intensity correspondence between the 110 peak of attapulgite and the 001 peak of montmorillonite was 1:2.32.

In one embodiment of the invention, 10–30% by weight of concentrated acid (based on the volatile free weight of clay being activated) is added to enough water and clay so that the volatile free solids content of the resultant clay/acid/water slurry is in the range 20–25 wt %. Thereafter, the slurry can be heated for 1–5 hours with gentle stirring, filtered (washing is not necessary, but can be practiced), dried, and ground to yield a finished product suitable for use as described below. Although higher acid dosages may be employed, no significant advantages are imparted by this effort, and since acid is a costly reagent, lower acid dosages are preferred.

As can be seen from TABLE 1, treatment with acid tends to reduce CaO, MgO, and $P_2O_5$ content at all dosage levels (accompanied by an apparent increase in SiO$_2$ content). Only at the higher acid dosages is Al$_2$O$_3$ significantly removed from the clay. This suggests that exchange of Ca$^{++}$ and Mg$^{++}$ for protons is the primary role of the acid at lower dosages, but that actual leaching of the clay structure (i.e.—removal of structural ions) does begin to occur at the higher acid dosages.

In general, the process of the invention comprises selecting an acidic naturally-occurring attapulgite clay, crushing, preferably subjecting the clay to a preliminary drying step; typically to 15 to 30 wt % VM, grinding the dry clay, mixing the clay with a diluted acid, drying and thereafter pulverizing unless the acid treated clay is already in desired particulate form. Preliminary drying is carried out under conditions such as to render the clay amenable to the grinding method used, e.g., heating at 200°-300° F. to reduce to 15 to 25 wt % VM. Optionally, the source clay is extruded before drying and grinding. In some instances, grinding can take place before drying.

The following discussion illustrate advantages and essential differences between the processes made possible by the use of high susceptibility attapulgite clays.

Conventional processing entails crushing, predrying (necessary so the clay particles will break apart or "slake" properly when added to water to give a uniform, colloidal dispersion suitable for activation), a mixing step (where clay, acid and water are combined), a treater or "leach" step (where the clay/acid/water slurry is heated to near boiling with gentle agitation for about 5 to 5½ hours), and a washing/filtration step (where entrained unused acid and acidic salts are extracted from the filter cake). Some of the liquid waste stream from this step can be recycled back to the mixer, but the greater majority must be disposed of by other means. Since aluminum containing salts formed from the reaction between the acid and bentonite clay during the leaching process are highly toxic to aquatic life, the waste stream from this process cannot be discharged to surface waters or to the subsurface water table. In some cases, an expensive deep well injection facility must be maintained to dispose of these wastes, and in other cases, the acidic wastes are precipitated with lime or caustic, and the neutral solids produced are placed in land-fill. In any case, some method of waste disposal is required for an environmentally sound operation. The extracted filter cake from this operation is then dried ground, and bagged or placed in bulk storage.

In contrast to the process just described, processes of the invention utilizing high susceptibility source clays are simpler, more economical and do not generate waste products which are difficult to dispose of and add to production costs.

In accordance with the spray coating embodiment of the invention, the coarse feed from the crusher (nominal ¼" diameter particles) is feed directly to a drying and grinding operation where it is dried to a level somewhat dryer than desired for the finished product, and ground to the desired average particle size. Typically, the production has 10-15 wt % VM and 80-85 wt % is finer than 200 mesh.

An acid/water mixture is then sprayed directly onto the dried and ground powder using such proportions of acid and water that optimized bleaching performance of the finished product is attained. Preferably, the acid/water spray is added directly to the powder while it is still warm and before it takes up moisture from the surrounding atmosphere. Intimate mixing of the raw clay powder and the acid/water spray can be achieved by any number of methods, including, for example, spraying the acid/water into the clay as it is mixed in a glass-lined Pfaudler mixing vessel, by spraying acid solution into the tumbled clay powder in a rotating rotary pan spray-coating machine, by spraying onto the clay as it travels along a moving belt conveying system, or by spraying onto the clay as it is moved by a screw conveyor. The dried, ground powder, now impregnated with the acid/water mixture, is bagged or placed in bulk storage as finished product.

The following outlines the essential steps of the spray drying process to produce acid-activated bleaching clay from high susceptibility source clays. In this case, raw clay is first crushed, then dried, typically to 20-30 wt % VM at 200°-300° F., and pulverized to produce a finely ground powder (e.g., 99%-200 mesh) suitable for spray drying using either high pressure nozzles or a spinning disk as commonly used in these apparatus. The finely ground clay is mixed with sufficient water and requisite sulfuric acid to form a slurry which can be spray dried. The high susceptibility source clay used in this process will be activated instantaneously during the spray drying operation; therefore, heating of the slurry before the spraying operation need not be practiced although such heating will not be deleterious to the final product. The spraying conditions are set to produce spray-dried particles whose average diameter falls in the range 15-30 microns. These particles of acid-activated high susceptibility source clay can be bagged or placed in bulk storage as finished product.

The essential steps of the modified conventional process to produce acid-activated bleaching clay from high susceptibility source clays is as follows. This process uses the same equipment and process train as that previously described for a conventional acid-activation process, but with the following essential differences: (i) much lower acid dosages are employed (i.e., 3-10 grams of 98% H$_2$SO$_4$/100 grams of dry clay); (ii) shorter reaction times can be employed (1-3 hours); (iii) 100% of the "sour" water which is recovered from the filtration step can be recycled back to the mixing step where only enough additional water plus fresh mineral acid is added to achieve the desired levels of bleaching activity; and (iv) since all of the sour water is recycled, there is no waste stream of acidic salts and unused acid requiring disposal.

When edible (and inedible) animal or vegetable oils are treated with bleaching clays, the objective is to reduce the levels of certain trace constituents (including carotenoids such as B-carotene, pheophytins and chlorophyll, and peroxides, among others). Color pigments, such as B-carotene (reddish-orange pigment) and chlorophyll (green pigment) must be removed if the oils is to be of suitably light color to meet with consumer acceptance; peroxides (highly reactive molecules) must be removed in order to obtain an oil exhibiting good photolytic and chemical stability (i.e.,—one which will not rancidify easily). Additionally, it is desired that levels of free fatty acids produced when contacting vegetable oils with acid-activated bleaching clays should not be excessively high since they constitute a refining loss.

Those familiar with the art of bleaching are aware of these and other quality control tests to monitor oil quality during bleaching. Red and yellow color is commonly monitored using an automatic tintometer according to the procedures listed in the American Oil Chemists' Society Official and Tentative Methods (AOCS Official Method Cc 13b-45); chlorophyll (AOCS Official Method Cc 13d-44); peroxides (AOCS Official Method Cd 8-53; rev. Ja 8-87); and free fatty acids (AOCS Official Method Ca 51-40). In all cases, the lower the values obtained, the better the quality of the resultant oil. Typically, for instance, when bleaching a caustic refined soybean oil, refiners find that chlorophyll reduction is the most important quality parameter, and over time, it has been found that adequate bleaching has occurred if this constituent can be reduced to the 50-90 ppb range. When this level is obtained, other oil constituents are usually well below the levels of which they would cause problems with regard to achieving satisfactory finished oil quality.

The following examples are presented in order to more fully explain and illustrate the invention. The examples are not be construed as limiting the invention.

EXAMPLE 1

Three different source clays (A—high purity attapulgite clay; B—high purity bentonite clay; and C—high susceptibility attapulgite clay) were subjected to acid-activation with sulfuric acid at varying acid dosages for 5½ hours, and then washed, filtered, dried and ground to finished products. Following are chemical and physical properties of clays A, B and C along with a summary of activation condition.

TABLE 1

| ACID (b) DOSE | CHEMICAL PROPERTIES OF STUDY CLAYS (a) | | | | | | | | | SLURRY pH |
|---|---|---|---|---|---|---|---|---|---|---|
| | CHEMICAL ANALYSIS (WT %, Vf BASIS) | | | | | | | | | |
| | SiO2 | Al2O3 | Fe2O3 | CaO | MgO | K2O | Na2O | TiO2 | P2O5 | |
| CLAY A (1) | | | | | | | | | | |
| 0 | 67.4 | 10.2 | 3.88 | 5.39 | 11.3 | 0.87 | 0.04 | 0.50 | — | 8.6 |
| 10 | 72.7 | 11.4 | 4.05 | 2.76 | 10.8 | 0.88 | 0.09 | 0.53 | — | 6.4 |
| 20 | 73.5 | 10.5 | 4.04 | 0.53 | 8.8 | 0.86 | 0.08 | 0.55 | — | 3.5 |
| 30 | 75.1 | 9.2 | 4.11 | 0.25 | 8.0 | 0.84 | 0.07 | 0.57 | — | 3.1 |
| 45 | 78.1 | 8.0 | 3.60 | 0.18 | 6.8 | 0.80 | 0.08 | 0.60 | — | 2.7 |
| 60 | 80.9 | 6.7 | 2.65 | 0.13 | 6.0 | 0.78 | 0.05 | 0.61 | — | 2.6 |
| 90 | 85.1 | 4.6 | 1.47 | 0.07 | 4.8 | 0.69 | 0.09 | 0.60 | — | 2.6 |
| CLAY B (1) | | | | | | | | | | |
| 0 | 65.6 | 18.9 | 5.61 | 4.07 | 3.6 | 0.83 | 0.05 | 0.89 | — | 8.6 |
| 10 | 68.0 | 19.6 | 5.50 | 1.83 | 3.1 | 0.76 | 0.05 | 0.93 | — | 3.5 |
| 35 | 72.7 | 16.8 | 5.01 | 1.39 | 2.5 | 0.77 | 0.09 | 0.99 | — | 2.9 |
| 50 | 76.2 | 14.1 | 4.43 | 1.15 | 2.0 | 0.81 | 0.15 | 0.99 | — | 3.4 |
| 60 | 77.8 | 12.6 | 3.95 | 1.63 | 1.7 | 0.81 | 0.20 | 0.96 | — | 3.8 |
| 95 | 84.6 | 8.1 | 2.66 | 0.98 | 0.8 | 0.87 | 0.32 | 0.72 | — | 2.9 |
| CLAY C (2) | | | | | | | | | | |
| 0 | 67.6 | 10.0 | 3.44 | 3.96 | 11.5 | 0.97 | 0.13 | 0.55 | 1.13 | 6.4 |
| 3 | 71.7 | 9.6 | 3.53 | 2.30 | 10.4 | 0.95 | 0.13 | 0.51 | 0.70 | 5.9 |
| 5 | 71.4 | 9.4 | 3.50 | 2.46 | 10.4 | 0.94 | 0.11 | 0.50 | 0.40 | 5.2 |
| 10 | 72.7 | 9.6 | 3.48 | 1.77 | 10.2 | 0.97 | 0.13 | 0.52 | 0.25 | 5.0 |
| 30 | 74.5 | 9.1 | 3.26 | 0.98 | 9.3 | 0.92 | 0.10 | 0.53 | 0.13 | 3.3 |

(a) Clay A - high purity attapulgite; B- high purity bentonite; C- high susceptibility attapulgite clay (HSAC).
(b) % Acid Dose = (wt of pure acid × 100)/(wt of dry clay).
(1) Acid activation conditions: conc. H2SO4; 25 wt % solids; 5.5 hrs; 210 F; then washed, filtered dried and ground to finished products.
(2) Activation conditions: 80 Vf gms Emcor 66 crude added to water, and then sufficient H2SO4 to achieve indicated dosages. Slurries heated at 160 F/1 hr; then washed (D.I. water), filtered, dried and ground to finished products.

These materials were then used at constant dosage either (0.5 wt % or 0.7 wt % clay, as is, based on amount of oil) to treat a typical caustic refined soybean oil. The oil quality parameters previously discussed were then measured as a function of activating acid dosage as shown in TABLES 2 and 3, and compared to those obtained when using two commercial bleaching clays, high activity Filtrol Gr 105, and very high activity Filtrol Gr 160.

Data in TABLES 2 and 3, show that all of the clay samples tested benefited from the acid-activation process. For example, compare the results obtained at 0% acid dosage (raw clay) versus those obtained at higher acid dosages. Nevertheless, the high purity attapulgite which contained 3% carbonate required at least 20% acid dosage to produce a product capable of achieving an oil quality where the most important quality parameter, chlorophyll, falls in the desired range (50 to 90 ppb). The high purity bentonite required even higher dosages (in the range 45-90%) to achieve comparable bleaching activity. In contrast, the high susceptibility attapulgite clay (HSAC) which contains practically no carbonate achieved a chlorophyll bleaching efficiency in the desired range with as little as 10% acid dosage.

TABLE 2

EFFECT OF CLAY SOURCE ON RESPONSE TO ACID ACTIVATION (a) AND ADSORPTION EFFICIENCY FOR TREATING OIL

| SOURCE CLAY | % ACID DOSE (b) | .5 WT % CONTACTS | | | |
|---|---|---|---|---|---|
| | | LOVIBOND RED | CHLOROPHYLL (PPB) | PEROXIDE VALUE | % FFA (WT %) |
| A | 0 | 10.2 | 303 | 8.2 | 0.035 |
| | 10 | 9.7 | 194 | 7.0 | 0.041 |
| | 20 | 2.5 | 43 | 2.6 | 0.038 |
| | 30 | 2.4 | 49 | 2.6 | 0.039 |
| | 45 | 2.6 | 64 | 2.7 | 0.045 |
| | 60 | 4.1 | 31 | 4.0 | 0.042 |
| | 90 | 8.2 | 134 | 6.6 | 0.042 |
| B | 0 | 13.9 | 660 | | |

TABLE 2-continued

EFFECT OF CLAY SOURCE ON RESPONSE TO ACID ACTIVATION (a) AND ADSORPTION EFFICIENCY FOR TREATING OIL

| SOURCE CLAY | % ACID DOSE (b) | .5 WT % CONTACTS | | | |
|---|---|---|---|---|---|
| | | LOVIBOND RED | CHLOROPHYLL (PPB) | PEROXIDE VALUE | % FFA (WT %) |
| | 10 | 13.6 | 520 | | |
| | 20 | 13.4 | 381 | | |
| | 30 | 10.2 | 232 | | |
| | 45 | 8.0 | 85 | | |
| | 60 | 3.8 | 37 | | |
| | 90 | 2.6 | 15 | | |
| Gr 105 | — | 8.0 | 88 | 6.2 | 0.047 |
| Gr 160 | — | 3.8 | 34 | 3.4 | 0.049 |
| Starting Oil | — | 15.2 | 715 | 9.7 | 0.045 |

(a) See footnote 1, Table 1.
(b) % Acid Dose = (wt. of pure acid × 100)/(wt. of dry clay).

TABLE 3

EFFECT OF HIGH SUSCEPTIBILITY (LOW CARBONATE) ATTAPULGITE ACTIVATION (a)

| SOURCE CLAY | % ACID DOSE (b) | .7 WT % CONTACTS | | |
|---|---|---|---|---|
| | | LOVIBOND RED | CHLORO-PHYLL (PPB) | % FFA (WT %) |
| C | 0 | 11.05 | 172 | 0.047 |
| | 3 | 10.65 | 178 | 0.051 |
| | 5 | 8.35 | 111 | 0.051 |
| | 10 | 6.35 | 62 | 0.050 |
| | 30 | 6.30 | 43 | 0.056 |
| Gr 105 STD | | 5.70 | 23 | 0.056 |
| Starting Oil | | 16.60 | 625 | 0.052 |

(a) See footnote 2, Table 1.
(b) % Acid Dose = (wt. of pure acid × 100)/(wt. of dry clay).

EXAMPLE 2

A sample of high purity attapulgite containing 3% calcium carbonate (Engelhard 200 UP/LVM, source clay A) and a sample of high purity bentonite (Filtrol GR 2, source clay B) were dried at 110° C. to the range 10-11 wt % LOD (loss on drying, 300° C.), ground (90%<200 mesh) and then broken into aliquots which were spray-coated with dilute solutions (10%-25%) of various acids to yield samples having been subjected to acid dosages between 1-8 wt %. The spray-coating was accomplished by spraying a mist of the dilute acid solution into a rotating vessel containing the dried, powdered samples of the above mentioned clays. After allowing the samples to equilibrate at room temperature for three days in closed containers, they were redried (at 110° C.) to the range 10-11 wt % LOI, and any agglomerates broken up so that the final sample was at least 90%<200 mesh.

These samples were then evaluated as in Example 1 (i.e.—0.5 wt % clay, as is, based on the amount of oil).

TABLE 4

EFFECT OF ACID DOSAGE AND ACID TYPE ON BLEACHING ACTIVITY (a) OF SPRAY-COATED ATTAPULGITE VS. BENTONITE SOURCE CLAY

| SOURCE CLAY | ACID TYPE | % ACID DOSE (b) | LOVIBOND RED | CHLOROPHYLL (PPB) | PEROXIDE VALUE | % FFA (WT %) |
|---|---|---|---|---|---|---|
| | none | 0 | 10.2 | 303 | 8.2 | 0.034 |
| A | H2SO4 | 1 | 11.4 | 302 | 8.0 | 0.034 |
| | | 3 | 8.6 | 208 | 7.3 | 0.036 |
| | | 5 | 9.1 | 188 | 7.5 | 0.036 |
| | | 8 | 8.0 | 128 | 6.9 | 0.037 |
| A | H3PO4 | 1 | 11.3 | 281 | 8.0 | 0.034 |
| | | 3 | 10.8 | 223 | 7.7 | 0.036 |
| | | 5 | 11.3 | 167 | 7.8 | 0.037 |
| | | 8 | 11.3 | 141 | 7.6 | 0.038 |
| A | citric | 1 | 12.0 | 293 | 9.4 | 0.035 |
| | | 3 | 12.0 | 283 | 9.2 | 0.038 |
| | | 5 | 12.8 | 266 | 9.7 | 0.038 |
| A | citric + H3PO4 | 3 | 11.6 | 264 | 7.8 | 0.035 |
| | | 5 | 11.8 | 227 | 8.0 | 0.036 |
| | | 8 | 12.5 | 190 | 8.1 | 0.036 |
| | none | 0 | 13.9 | 660 | 8.6 | 0.036 |
| B | H2SO4 | 1 | 14.5 | 686 | 9.2 | 0.037 |
| | | 3 | 14.6 | 695 | 9.2 | 0.035 |
| | | 5 | 14.0 | 689 | 9.0 | 0.035 |
| | | 8 | 13.4 | 642 | 9.2 | 0.037 |
| B | H3PO4 | 1 | 14.0 | 696 | 9.0 | 0.038 |
| | | 3 | 14.1 | 694 | 9.3 | 0.035 |
| | | 5 | 14.0 | 678 | 9.6 | 0.038 |
| | | 8 | 13.8 | 665 | 9.1 | 0.037 |
| B | citric | 1 | 14.8 | 685 | 10.4 | 0.035 |
| | | 3 | 14.7 | 695 | 10.9 | 0.039 |
| | | 5 | 14.3 | 681 | 10.4 | 0.038 |
| Gr 105 STD | | | 8.0 | 88 | 6.2 | 0.047 |
| Gr 160 STD | | | 3.7 | 39 | 3.3 | 0.049 |

TABLE 4-continued

EFFECT OF ACID DOSAGE AND ACID TYPE ON BLEACHING
ACTIVITY (a) OF SPRAY-COATED ATTAPULGITE VS. BENTONITE SOURCE CLAY

| SOURCE CLAY | ACID TYPE | % ACID DOSE (b) | LOVIBOND RED | CHLOROPHYLL (PPB) | PEROXIDE VALUE | % FFA (WT %) |
|---|---|---|---|---|---|---|
| uncontacted oil | | | 15.4 | 715 | 9.2 | 0.039 |

(a) All bleaching contacts done with 0.5% clay in soya oil.
(b) % Acid Dose = (wt. of pure acid × 100)/(wt. of dry clay).

As shown in TABLE 4, dosages as low as 3 wt % sulfuric acid applied to source clay A (high purity attapulgite containing 3% calcium carbonate) were sufficient to produce a material which removed at least ½ the red color and somewhat more than ⅔'s of the chlorophyll in that oil. Even better results would be expected when using a high susceptibility attapulgite clay (such as source clay C) because, as already shown, this clay reaches optimum activity levels at lower acid dosages than does an attapulgite containing significant carbonate levels. Even at that, quite acceptable Lovibond red, chlorophyll, and peroxide reductions were achieved with 3-8 wt % acid dosages as can be seen by comparing these data to those obtained with a commercial, high activity bleaching clay such as Filtrol Gr 105. In addition, % FFA rise was actually much superior to the commercial bleaching clays because whereas they are net generators of free fatty acids (compare to FFC level in uncontacted oil), the spray-coated attapulgite is actually a net adsorber of free fatty acids.

In contrast, source clay B (high purity bentonite) showed essentially no improvement at these low acid dosages, regardless of the level of acid (up to 8 wt %) and type of acid.

In these cases, all of the acid added to the clay remained associated with that sample, although conversion to calcium and magnesium salts via reaction with the high purity attapulgite source clay is highly likely. At any rate, adsorptive activities of these materials as well as their tendency to generate free fatty acids were quite acceptable even though none of the samples received any subsequent washing (a salient feature of being able to use this process with a high susceptibilty attapulgite clay). The superiority of sulfuric acid over the other acids utilized is clearly evident.

Although the spray-coated attapulgite used here was not as efficient as Gr 160 bleaching clay for removing red and green color (chlorophyll) on an equal weight basis, it would still be considered adequate, particularly in view of its superior free fatty acid reduction characteristics, and because it can be manufactured much more simply and cheaply than present commercial bleaching clays such as Gr 160.

The processes just described have numerous economic and procedural advantages over the process normally employed: (1) lower acid costs per unit mass of clay treated; (2) lower production costs (no washing, filtering, or waste treatments steps); and (3) environmental soundness (i.e.—no harmful environmental waste products are produced). Considering the fact that attapulgite clays are not normally used as the source of acid activated clay and almost a century of effort has been directed to manufacturing and improving acid-activated bleaching earths, the results were unexpected. It is believed that the vast number of prior art investigators overlooked the effect of carbonate (limestone) impurities on the activation process, thereby failing to note that certain palygorskite clays (those naturally acidic, hence low in free carbonate) would be amendable to a simple, cost effective treatment.

We claim:

1. A method for producing bleaching earth which comprises selecting a naturally-occurring acidic attapulgite clay having a pH in the range of 5 to 7 and a pore volume in the range of 0.25-0.50 cc/gm, mixing said clay with an acid solution in amount corresponding to an acid dosage in the range of 10 to 30%, heating said mixture at a temperature in the range of 77° to 220° F. to react said clay with said acid and, without washing the resulting reaction product, recovering it for use as a bleaching earth.

2. The method of claim 1 wherein said selected clay contains no more than about 5% $CO_2$ by weight on a moisture free basis.

3. The method of claim 1 wherein said selected clay contains less than 1% $CO_2$ on a moisture free basis.

4. The method of claim 1 wherein said selected clay is dried and ground before mixing with said acid.

5. The method of claim 1 wherein said mixture of clay and acid is heated while it is spray dried.

6. The method of claim 1 wherein said mixture of clay and acid is formed by spraying acid solution onto dried clay.

7. The method of claim 1 wherein said clay is dried and ground, mixed with acid solution, filtered after heating, and filtrate is recycled.

8. The method of claim 1 wherein said acid is sulfuric.

9. The bleaching earth product obtained by the method of claim 1.

* * * * *